(12) United States Patent
Eder et al.

(10) Patent No.: US 7,460,784 B2
(45) Date of Patent: Dec. 2, 2008

(54) METHOD FOR PREEMPHASISING AN OPTICAL MULTIPLEX SIGNAL

(75) Inventors: Christian Eder, München (DE); Wolfgang Peisl, München (DE); Lutz Rapp, Deisenhofen (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 440 days.

(21) Appl. No.: 10/554,171

(22) PCT Filed: Apr. 16, 2004

(86) PCT No.: PCT/EP2004/050546

§ 371 (c)(1),
(2), (4) Date: Oct. 21, 2005

(87) PCT Pub. No.: WO2004/100414

PCT Pub. Date: Nov. 18, 2004

(65) Prior Publication Data

US 2006/0233552 A1 Oct. 19, 2006

(30) Foreign Application Priority Data

May 8, 2003 (DE) ................. 103 20 715
Jun. 25, 2003 (DE) ................. 103 28 622
Sep. 23, 2003 (DE) ................. 103 44 067

(51) Int. Cl.
*H04B 10/08* (2006.01)

(52) U.S. Cl. ............... 398/26; 398/94; 398/34

(58) Field of Classification Search ........... 398/94, 398/197, 15, 38, 120, 171, 26, 34
See application file for complete search history.

(56) References Cited

U.S. PATENT DOCUMENTS 5,790,289 A * 8/1998 Taga et al. ............. 398/79

(Continued)

FOREIGN PATENT DOCUMENTS

DE 198 48 989 A1 5/2000

(Continued)

OTHER PUBLICATIONS

A.R. Chraplyly, J.A. Nagel and R.W. Tkach; "Equalization in Amplifier WDM Lightwave Transmission Systems"; IEEE Photonics Technology Letters; 1992, pp. 920-922; vol. 4, No. 8.

*Primary Examiner*—Kenneth Vanderpuye
*Assistant Examiner*—Hibret A Woldekidan
(74) *Attorney, Agent, or Firm*—Bell, Boyd & Lloyd LLP

(57) ABSTRACT

The invention relates to a method for easily and rapidly preemphasizing an optical multiplex signal transmitted by an emitter to a receiver consisting wherein signal-to-noise ratios are equalized by means of simple measurement or new adjustment of signal power on the bandwidth of the optical multiplex signal, at least in the receiver, instead of measuring the noise output power or the signal-to-noise ratio. Said invention is based on a balance of the signal-to-noise ratios which are authorized by a transmitting system, in which the spectral influences of gain profiles, noise effects and dampings are taken into consideration. In particular, when DWDM transmission techniques are applied, in which adjacent channel spacings of the optical multiplex signal are very low, the inventive method makes it possible to use a small number of sensitive and high-resolution measuring instruments for preemphasis control.

19 Claims, 8 Drawing Sheets

U.S. PATENT DOCUMENTS

| | | | |
|---|---|---|---|
| 5,815,299 A * | 9/1998 | Bayart et al. | 398/94 |
| 2002/0109883 A1 * | 8/2002 | Schemmann et al. | 359/156 |
| 2002/0154356 A1 | 10/2002 | Krummrich | |
| 2002/0167907 A1 * | 11/2002 | Sarkar et al. | 370/252 |

FOREIGN PATENT DOCUMENTS

| | | |
|---|---|---|
| EP | 1 130 803 A2 | 9/2001 |
| EP | 1 280 288 A1 | 1/2003 |
| EP | 1 349 310 A2 | 10/2003 |
| FR | 2 845 841 | 4/2004 |
| WO | WO 02/09299 A2 | 1/2002 |

* cited by examiner

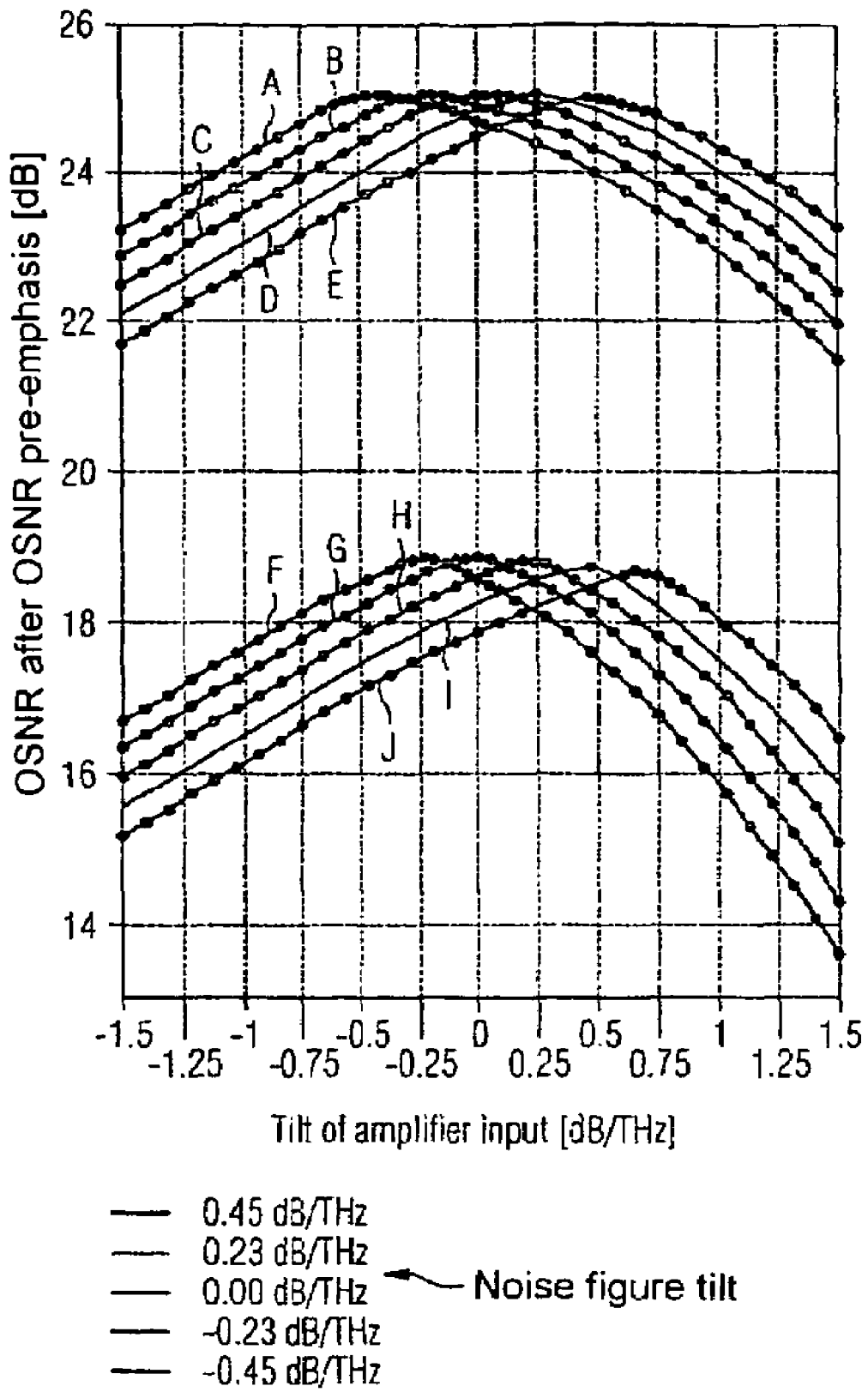

METHOD FOR PREEMPHASISING AN OPTICAL MULTIPLEX SIGNAL

CROSS REFERENCE TO RELATED APPLICATIONS

This application claims priority to the German application No. 10320715.5 filed May 8, 2003, German application No. 10328622.5 filed Jun. 25, 2003, German application No. 10344067.4 filed Sep. 23, 2003, and to the International Application No. PCT/EP2004/050546, filed Apr. 16, 2004 which are incorporated by reference herein in their entirety.

FIELD OF INVENTION

The invention relates to a method for pre-emphasizing an optical multiplex signal.

BACKGROUND OF INVENTION

Optical amplifiers for broadband optical signals exhibit a wavelength dependency of the gain which is not completely remedied by the smoothing filters normally used. In WDM or DWDM (WDM=Wavelength Division Multiplex; DWDM=Dense Wavelength Division Multiplex) transmission technology the optical signal consists of a number of channels featuring different wavelengths, with the spacing between the wavelengths nowadays able to be below 100 GHz. The wavelength dependency of the gain of amplifiers means that power differences accumulate between the individual channels when an optical signal passes through them so that the channels possess greatly differing optical signal-to-noise ratios OSNR and powers at the receivers.

In point-to-point-data connections therefore a known method referred to as pre-emphasis is used for equalizing the optical signal-to-noise OSNR values at least at the end of the link, said method having been described in A. R. Chraplyly, J. A. Nagel and R. W. Tkach: "Equalization in Amplifier WDM Lightwave Transmission Systems", IEEE Photonics Technology Letters, Vol. 4, No. 8, 1992, pp. 920-922. In this method the transmit-side channel powers are adjusted on the basis of an OSNR distribution measured at the link end in an iterative process until the same optical signal-to-noise ratio OSNR values are produced at the link end for all channels.

Frequently for determining the signal-to-noise ratios OSNR the Amplified Spontaneous Emission (ASE) between the channels is measured and from this the noise power overlaid on the channels is calculated by interpolation. This is however no longer possible if the amplified spontaneous emission ASE between the channels is attenuated by optical components. This is the case for example if further modules such as add-drop modules or interleaver filters are connected into the transmission link.

SUMMARY OF INVENTION

All the conventional methods for measurement of OSNR distribution at the end of the link have one thing in common in that they are restricted to channels in the 100 GHz grid. Furthermore the methods are as a rule too slow (separate measurements for channel powers and powers of the amplified spontaneous emission ASE), to enable them and to be appropriate for the time requirements in dynamic optical networks, e.g. maximum around 10 seconds for a channel upgrade.

From DE 19848989 a method is known for the channel-by-channel setting of transmit signal powers, in which, if the permitted limits of the transmit-side dynamic range are exceeded, a compression of the individual transmit signal powers is undertaken such that the transmit signal accumulated power is kept almost constant. This method is also used when the limit for the receiver-side dynamic range is exceeded.

Since this method is based on measured OSNR values the problems already described above of OSNR measurement with small channel spacings arise here.

An object of the invention is to specify a method which makes possible a rapid pre-emphasis of an optical multiplex signal. The method should also be suitable for a WDM transmission along an optical transmission link to be defined with channel spacings that can be as narrow as required.

The object is achieved by the claims.

Starting with a method for pre-emphasizing an optical multiplex signal which features as channels a number of signals of different wavelength which are transmitted from transmitters to receivers for which the powers of the signals are set at the transmitter and measured at the receiver, in accordance with invention determination of the optical signal-to-noise ratios OSNR at the receiver is no longer needed. To this end an average power of the signals at the transmitter is determined and subsequently on the transmitter side new powers of the signals are set from current powers of the signals at the transmitter and at the receiver and from the average power at the transmitter such that the signal-to-noise ratios at the receiver remain approximately the same.

This is achieved in a first approximation solution explained in detail below when power spectrums of the channel at the transmitter and at the receiver form approximately inverse functions. A more precise and more adequate achievement of the same signal-to-noise ratios at the receiver of a transmission link is also defined, taking into consideration a wavelength dependency of noise figures, gains and attenuations.

The major advantage of the invention is that no measurement of the signal-to-noise ratios or the noise powers but only level measurements of signals are necessary. Because of the measurement and resetting of the powers at a transmitter by means of a simple measurement of signal powers at a receiver, the pre-emphasis in accordance with the inventive standard formula is performed much more quickly than a pre-emphasis based on optical signal-to-noise ratios OSNR. This means that system-dependent and thus expensive measurement of noise powers of the signals is no longer needed.

Setting the inverse function between power spectrums leads in a very good approximation to identical optical signal-to-noise ratios OSNR for all channels. With a transmission system a tolerated deviation or deterioration can be defined in advance, i.e. the optical signal-to-noise ratios OSNR must change during pre-emphasis in such a way that no transmission errors occur. On the basis of a permitted balance or of a tolerated interval between the optical signal-to-noise ratios OSNR a simple inventive regulation formula for pre-emphasis is produced which represents the new settings of the signal powers at the transmitter without determination of the current optical signal-to-noise ratios OSNR.

A further advantage of the method in accordance with the invention is to be seen in that fact that a complicated measurement of noise powers between the channels or even a direct and technically very expensive measurement of the amplified spontaneous emission ASE overlaid on the channels is dispensed with for determination of the optical signal-to-noise ratios OSNR. The method is thus best suited for any given narrow wavelength spacings between the channels.

Of course it is possible to combine this method with a subsequent pre-emphasis which is based on a measurement of the optical signal-to-noise ratio OSNR and which leads to an optimum setting of the channel powers at the transmitter. The fact that significantly more time is necessary here has no negative effects on the transmission quality. The method in accordance with the invention however no longer requires any such pre-emphasis to meet almost the same requirements. This advantageous aspect has been verified theoretically and experimentally in the laboratory. This has enabled savings to be made of costly spectrum resolving measurement instruments such as optical spectrum analyzers.

A significant advantage of the invention also lies in the fact that the method described is not sensitive to any existing tilting or to a further uneven spectral distribution of the powers and/or the optical signal-to-noise ratios OSNR at the transmitter.

In the overall invention the expressions "transmitter" and "receiver" are used for reasons of simple presentation. It should be made clear here that these expressions designate any point on a transmission link at which the inventive pre-emphasis can be performed, that is for example at optical amplifiers, at multiplexer and demultiplexers, at spectrally controllable filters, etc. For this to be done, at at least one "transmitter" point a first regulation and measurement module provided for the power spectrum and at a "receiver" point a second measurement module provided for the power spectrum must be present.

For execution of the inventive method for pre-emphasis a simple suitable optical transmission path is specified. This transmission path could be part of a more complex optical network.

Advantageous developments of the invention are specified in the dependent claims.

BRIEF DESCRIPTION OF THE DRAWINGS

Exemplary embodiments of the invention are explained in more detail below with reference to the drawing.

The Figures show:

FIG. 9: signal-to-noise ratios after a pre-emphasis as a function of a tilting of an amplifier input, FIG. 10 *a, b, c, d*: signal-to-noise ratios as a function of the exponent k for different amplification gains.

DETAILED DESCRIPTION OF INVENTION

Figure 1:
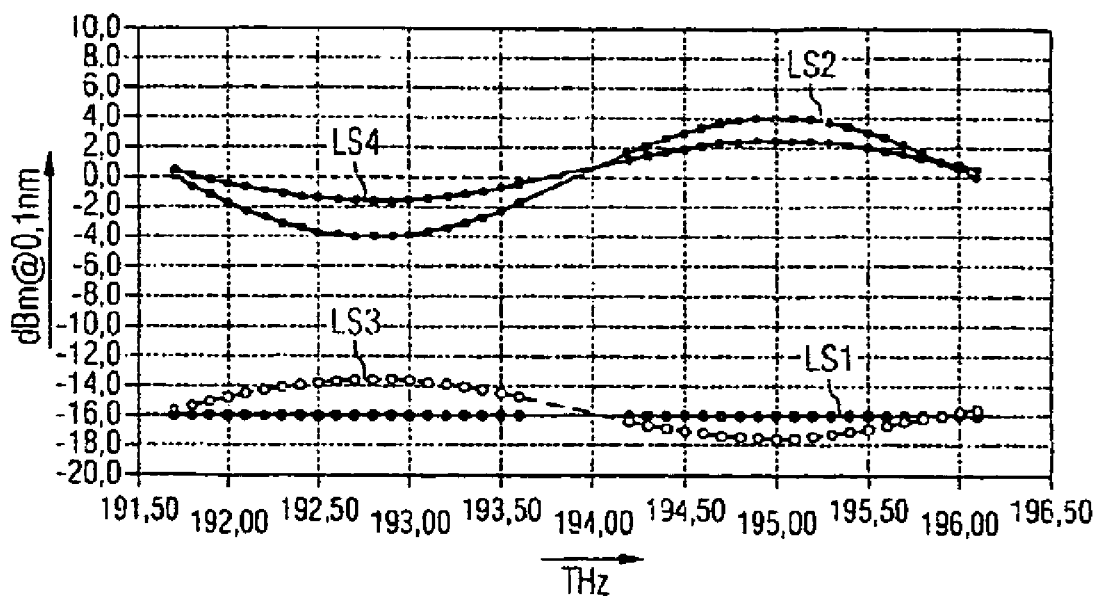
FIG. 1: Power spectrums of the channels at the transmitter and at the receiver before and after the pre-emphasis.

FIG. 1 shows power spectrums LS1, LS2, LS3, LS4 of the channels at the transmitter and at the receiver before and after the pre-emphasis for an optical DWDM signal with 80 channels (frequency spacing=50 GHz).

Before the pre-emphasis the measured signal power spectrum LS1 at the transmitter is constant at an average power value of −16 dBm. By contrast the measured signal power spectrum LS2 at the receiver features any profile, with the channels exhibiting power differences of up to 830 dB. The deviation can represent both a linear function of the wavelength as with a tilt or in general a non-linear function of the wavelength.

In accordance with the permitted balance of the optical signal-to-noise ratios OSNR at the receiver the pre-emphasis is now executed by inverting the signal power spectrum LS1 at the transmitter. A regulation formula of the inversion is given below. Thus two new signal power spectrums LS3 at the transmitter and LS4 at the receiver are produced. The signal-to-noise ratios OSNR at the receiver now form a flat spectrum.

Figure 2:
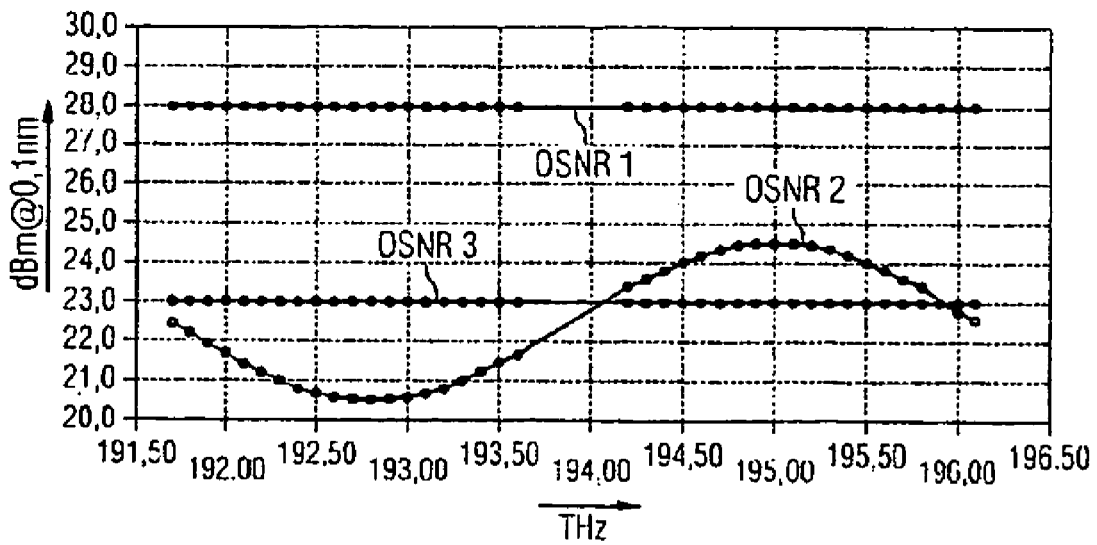
FIG. 2: Spectrums of the optical signal-to-noise ratios OSNR of the channels at the transmitter and at the receiver before the pre-emphasis and at the transmitter after the pre-emphasis.

FIG. 2 shows spectrums OSNR1, OSNR2 of the signal-to-noise ratios OSNR of the channels at the transmitter and at the receiver before the pre-emphasis as well as a spectrum OSNR3 of the optical signal-to-noise ratios OSNR of the channels at the receiver after the pre-emphasis for the optical signal in accordance with FIG. 1.

Before pre-emphasis the spectrum OSNR1 at the transmitter measured here for the experiment is constant for an average value of 28 dB. The spectrum OSNR2 at the receiver by contrast has any profile which deviates from an average value at appr. 23 dB. The deviation can represent both a linear function of the wavelength as with a tilt or in general a non-linear function of the wavelength. After the pre-emphasis the spectrum OSNR3 is flat at the receiver.

Figure 3:
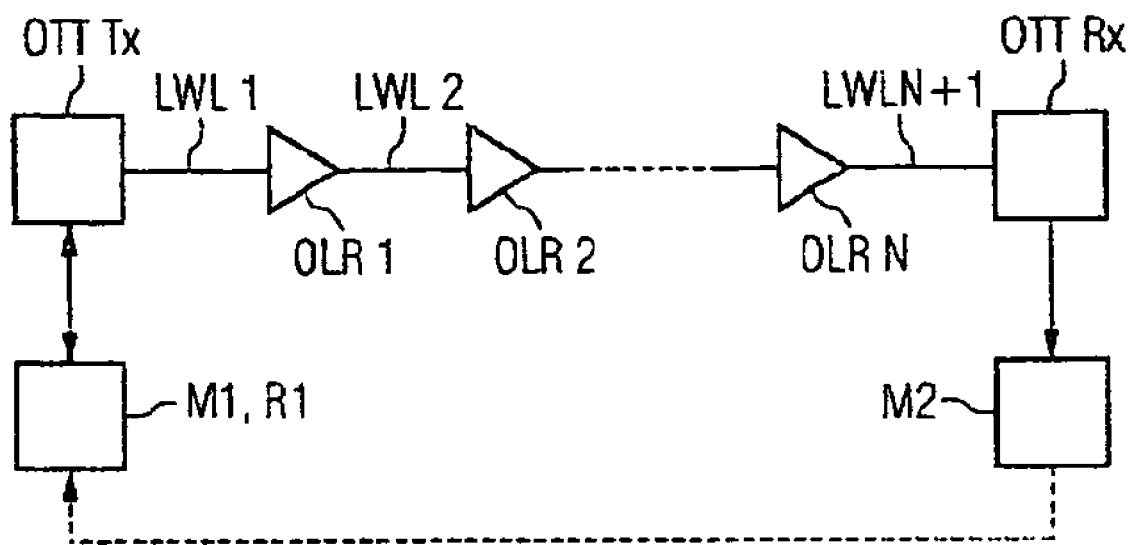
FIG. 3: an optical transmission link for executing the pre-emphasis in accordance with the invention.

FIG. 3 shows an optical transmission link with frequency-dependent elements—in this case intermediate amplifiers OLR1, OLR2, . . . , optical waveguides LWL1, LWL2, . . . , etc lying between transmitter OTT Tx and receiver OTT Rx for execution of the method in accordance with the invention for pre-emphasis. A power measurement device M1, M2 is connected in each case to the transmitter OTT Tx and the receiver OTT Rx and a power regulation device R1 to the transmitter OTT Tx, which merely measure or regulate the level of the transmitted signals on the send side and the receive side.

A mathematical description of the method shown in FIGS. 1 and 2 is specified, in which it is assumed that the transmitted multiplex signals have the bandwidth $\Delta\lambda$.

The designations used are as follows:

| | |
|---|---|
| Transmitter | OTT Tx |
| Receiver | OTT Rx |
| Channel (wavelength): | $\lambda = \lambda\text{min}, \ldots, \lambda\text{max}$ |

Bandwidth $\Delta\lambda = \lambda\text{max} - \lambda\text{min}$

Channel powers at OTT Tx: $P_{in}(\lambda)$ {in mW}

Channel powers at OTT Rx: $P_{OUT}(\lambda)$ {in mW}

Average input power:

$$P_{IN} >= \frac{1}{\Delta\lambda} \cdot \int_{\Delta\lambda} P_{IN}(\lambda) d\lambda \text{(in mW)}$$

Average output power:

$$P_{OUT} >= \frac{1}{\Delta\lambda} \cdot \int_{\Delta\lambda} P_{OUT}(\lambda) d\lambda \text{(in mW)}$$

In general the average value—here over a wavelength range—of a value X is signalled by the notation <X> between pointed brackets <X>.

The summed input power of the channels with the wavelengths $\lambda=\lambda\text{min}, \ldots, \lambda\text{max}$ is held constant at the transmitter OTT Tx. New channel powers $P_{in}(\lambda)$_new (linear in mW) to be set at the transmitter OTT Tx, while retaining the existing summed input power ($=\Delta\lambda \cdot <P_{IN}>$) by means of a function $Q(\lambda)$ are thus as follows:

$$P_{IN}(\lambda)\_\text{new:} = <P_{IN}> \cdot \frac{Q(\lambda)}{\frac{1}{\Delta\lambda} \cdot \int_{\Delta\lambda} Q(\lambda) d\lambda}.$$

A permitted balance of the signal-to-noise ratios OSNR are approximated by the following reasoned approach $$\sqrt{P_{IN}(\lambda) \cdot P_{OUT}(\lambda)} = \text{const (i.e. constant)}$$

which produces the following equation for the function $Q(\lambda)$:

$$Q(\lambda) = \frac{P_{IN}(\lambda)}{\sqrt{P_{IN}(\lambda) \cdot P_{OUT}(\lambda)}} = \sqrt{\frac{P_{IN}(\lambda)}{P_{OUT}(\lambda)}}$$

This equation shows that the function Q corresponds to the square root of the transmission function of the signals.

This allows the new input powers $P_{IN}(\lambda)$_new to be set very quickly for each channel by means of the average input power and the available or new input and output powers $P_{IN}(\lambda)$ and $P_{OUT}(\lambda)$. This means that no measurements of the signal-to-noise ratios OSNR or of noise powers are needed.

In a suitable case the new values are set by a simple inversions between power spectrums of the transmitter and the receiver.

Furthermore a more precise derivation of the new power spectrum to be set $P_{IN}(\lambda)$_new is now specified for a consideration of wave-length-dependent noise figures $Fi(\lambda)$ (I=O, . . . ,N) of one or more optical amplifiers VO, V1, . . . ,VN arranged along a transmission link. This derivation shows the extent to which the inventive pre-emphasis is suitable for use in transmission systems in respect of required transmission tolerances. In addition variants of the method are also produced from this which achieve a higher accuracy, but require knowledge of additional parameters, which can either be measured directly at the system or even during production. Alternatively typical values can also be used.

It is shown that despite influences of the noise figure $Fi(\lambda)$ the pre-emphasis in accordance with the invention makes a tolerable evening out of the signal-to-noise ratios OSNR at the end of the transmission link for a number of N+1 cascaded optical amplifiers Vi connected by N optical lines OLi (I=1, . . . ,N) with attenuation Ai. Where further more precise fulfillments are needed, the noise figures Fi(a,) can also be taken into account, e.g. through the technical delivery specifications of an optical amplifier.

Let the gain $Gi(\lambda)$ of one of the optical amplifiers Vi (I=0, . . . N) be given by:

$$Gi(\lambda) = <Gi> \cdot g(\lambda)$$

with <Gi> designating and average gain and $g(\lambda)$ a normalized spectral dependency function of the gain $Gi(\lambda)$.

In precisely the same way the attenuation $Ai(\lambda)$ of the optical lines OLi and the noise figure $Fi(\lambda$ can be described:

$$Ai(\lambda) = <Ai> \cdot a(\lambda)$$

$$Fi(\lambda) = <Fi> \cdot f(\lambda)$$

For simplification of the presentation the assumption has been made that the wavelength dependencies $a(\lambda)$ and $f(\lambda)$ of the attenuation $Ai(?,)$ and the noise figure $Fi(\lambda)$ are almost identical for all amplifiers and interconnected fibers.

At the end of the transmission link OTT Rx the output lines $P_{OUT}(\lambda)$ are defined as a function of the wavelength $\lambda$ by:

$$P_{OUT}(\lambda) = \prod_{i=1}^{N} Ai(\lambda) \cdot \prod_{i=0}^{N} Gi(\lambda) \cdot P_{IN}(\lambda)$$

$$= P_{IN}(\lambda) \cdot G0 \cdot \prod_{i=1}^{N} Ai(\lambda) \cdot Gi(\lambda)$$

with G0 being the gain of the first optical amplifier VO used as a booster on the transmit side. For the optical amplifiers Vi amplified spontaneous emission ASE occurs, which for a channel of a broadband optical signal having the wavelength $\lambda$ leads to a noise power component $P_{ASR}(I,\lambda)$ $$P_{ASE}(i,\lambda) = hv \cdot B_0 \cdot [Fi(\lambda) \cdot Gi(\lambda) - 1]$$

In this equation h represents Plank's constant, v the frequency of the channel concerned and $B_0$ the measurement bandwidth.

At the transmitter OTT Tx and at the receiver OTT Rx of the complete transmission link VO, LWL1, V1, LWL2, . . . , LWLN, VN a channel at the wavelength $\lambda$, with input line $P_{IN}(\lambda)$ and output line $POUT(\lambda)$ has an accumulated noise power $P_{ASR}(\lambda)$ which is calculated as follows:

$$P_{ASE}(\lambda) = hv \cdot B_0 \cdot \left\{ \sum_{j=0}^{N} [Fj(\lambda) \cdot Gj(\lambda) - 1] \cdot \prod_{i=j+1}^{N} Ai(\lambda) \cdot Gi(\lambda) \right\}$$

The wavelength-dependent optical signal-to-noise ratios OSNR at transmitter OTT Tx are defined by:

$$OSNR = \frac{P_{OUT}(\lambda)}{P_{ASE}(\lambda)}$$

The approach for balance of the optical sign-to-noise ratios OSNR is based on an evening out of these at the transmitter OTT Tx. This can be implemented by the following condition (const=constant):

$$\frac{1}{OSNR} = \frac{hvB_0}{P_{IN}(\lambda)} \cdot \frac{\sum_{j=0}^{N}[Fj(\lambda) \cdot Gj(\lambda) - 1] \cdot \prod_{i=j+1}^{N} Ai(\lambda) \cdot Gi(\lambda)}{G0 \cdot \prod_{i=1}^{N} Ai(\lambda) \cdot Gi(\lambda)} \stackrel{!}{=} const$$

By now defining the already known function $Q(\lambda)$ as:

$$Q(\lambda) = \frac{\sum_{j=0}^{N}[Fj(\lambda) \cdot Gj(\lambda) - 1] \cdot \prod_{i=j+1}^{N} Ai(\lambda) \cdot Gi(\lambda)}{\lambda \cdot G0 \cdot \prod_{i=1}^{N} Ai(\lambda) \cdot Gi(\lambda)}$$

this condition can be formulated for identical optical signal-to-noise ratios OSNR of all channels at the receiver OTT Rx as follows:

$$P_{IN}(\lambda)\_\text{new:} = \;<P_{IN}> \cdot \frac{Q(\lambda)}{<Q(\lambda)>}$$

with $$<Q(\lambda)> = \frac{1}{\Delta\lambda}\int_{\Delta\lambda} Q(\lambda) d\lambda$$

This equation describes the new channel powers to be set very precisely but does not require any knowledge of numerous parameters. Thus the influence of different parameters such as the noise figure $Fi(\lambda)$, the gain $Gi(\lambda)$ and the attenuation $Ai(\lambda)$ on the wavelength dependency of the function $Q(X)$ is considered below. Initially this aspect is described by means of an exemplary embodiment for a transmission link with N+1 optical amplifiers and with N optical lines OLi connected between the optical amplifiers, in which a broadband optical signal with a number of channels is transmitted from the transmitter OTT Tx to the receiver OTT Rx.

As a rule the gains of the amplifiers Vi are set so that they compensate for the attenuation losses in the subsequent spans OLi, so that $$<Gi(\lambda)> = \frac{1}{<Ai(\lambda)>}$$

This means that the function $Q(X)$ can be described as follows:

$$Q(\lambda) = \frac{\sum_{j=0}^{N}[<Fj> \cdot <Gj> \cdot fj(\lambda) \cdot gj(\lambda) - 1] \cdot \prod_{i=j+1}^{N} ai(\lambda) \cdot gi(\lambda)}{\lambda \cdot <G0> \cdot g0 \cdot \prod_{i=1}^{N} ai(\lambda) \cdot gi(\lambda)}$$

Starting from values known is practice such as $<Fj>\cong 2$ and $<Gj>\cong 100$, it is implicit that:

$$<Fj>\cdot<Gj>\cdot fj(\lambda)\cdot gj(\lambda) >> 1$$

It is further assumed that the optical amplifiers Vi as well as the optical lines OLi are quasi-identical. This assumption is fulfilled as a rule since in relation to gain and attenuation critical deviations from the technical attributes of the components Vi, OLi are minimized or optimized as much as possible in their manufacturing or in the installation of a network and the wavelength dependency of the gain of optical amplifiers is practically independent of the gain set.

Thus individual average value and individual spectral dependency functions of the noise figure $<F>=<Fi>$, $f(\lambda)=fi(\lambda)$, of the gain $<G>=<Gi>$, $g(\lambda)=gi(\lambda)$ and the attenuation $<A>=<Ai>$, $a(\lambda)=ai(\lambda)$ is used for all components Vi, OLi which leads to a simpler new form of the function $Q(\lambda)$:

$$Q(\lambda) = \frac{<F>\cdot f(\lambda)}{\lambda} \cdot \frac{[a(\lambda)\cdot g(\lambda)]^{N+1} - 1}{[a(\lambda)\cdot g(\lambda)]^N \cdot [a(\lambda)\cdot g(\lambda) - 1]}$$

This equation leads to the approximation $$\frac{Q(\lambda)}{<Q(\lambda)>} \propto \frac{f(\lambda)}{\lambda} \cdot \frac{1}{N+1} \cdot \frac{[a(\lambda)\cdot g(\lambda)]^{N+1} - 1}{[a(\lambda)\cdot g(\lambda)]^N \cdot [a(\lambda)\cdot g(\lambda) - 1]}$$

This last function takes account of the spectral ripple of the noise figure, of the gain and of the attenuation over a desired bandwidth in the wavelength range Äk.

By means of the measurement of the power spectrum or of the total gain $G_{LINK}=[a(\lambda)g(\lambda)]^{N+1}$ at the receiver OTT Rx the following equation is obtained:

$$\frac{Q(\lambda)}{<Q(\lambda)>} \propto \frac{f(\lambda)}{\lambda} \cdot \frac{1}{N+1} \cdot \frac{G_{LINK} - 1}{G_{LINK}^{\frac{N}{N+1}} \cdot [G_{LINK}^{\frac{1}{N+1}} - 1]}$$

With knowledge or estimation of the noise figure $f(\lambda)$ from one or more optical amplifications in the transmission link the function $Q(\lambda)/<Q(\lambda)>$ can thus be determined independent of the wavelength. The pre-emphasis is in this case thus more than just the simple inversion of the power spectrums between receiver and transmitter, but is still only based on signal power measurements or power measurements.

Formulated in another way, if the wavelength dependency of the noise figure F(I) of the optical amplifier is known (analytically or in tabular form), this dependency can be taken into account in the pre-emphasis more accurately than by means of the previously-mentioned inversion of the power spectrums.

the following equation is of interest as concrete ranges of values for a practical application:

$$1 \leq N \leq 20$$

$$0.7\; dB \leq 10\;\log[g(\lambda)] \leq 0.7\; dB \qquad\qquad\text{i}$$

since nowadays typical amplifiers such as EDFAs (Erbium Doped Fiber Amplifiers) exhibit gain ripples below 1,4 30 dB.

For these ranges of values the function $Q(\lambda)/<Q(\lambda)>$ can be well approximated by $1/\sqrt{G_{LINK}}$. This means that the pre-emphasis will be undertaken independently of the number N of spans Vi, OLi.

This approximation again confirms the assertion previously made that with the two following equations:

$$P_{IN}(\lambda)\_\text{new:} = <P_{IN}> \cdot \frac{Q(\lambda)}{<Q(\lambda)>} \{\text{in mW}\}$$

$$\text{mit } <Q(\lambda)> = <\sqrt{\frac{P_{IN}}{P_{OUT}}}>$$

and $$G_{LINK} = \frac{P_{OUT}}{P_{IN}}$$

the new powers to be set PIN(λ) new at the transmitter OTT Tx are calculated as follows for the pre-emphasis:

$$P_{IN}(\lambda)\_\text{new:} = <P_{IN}> \cdot \sqrt{\frac{P_{IN}}{P_{OUT}}} \cdot \frac{1}{\left<\sqrt{\frac{P_{IN}}{P_{OUT}}}\right>}$$

in this case the pre-emphasis is based on the simple inversion of the power spectrums at the transmitter OTT Tx and at the receiver OTT Rx.

If an additional power setting of the channels at the transmitter OTT Rx is provided, the pre-emphasis can also be controlled in a bidirectional way. This means that the optical signal-to-noise ratios OSNR at the receiver OTT Rx and at the transmitter OTT Tx exhibit a flat spectrum.

Further exemplary embodiments of the invention are explained in more detail below with reference to the drawing.

Figure 4:
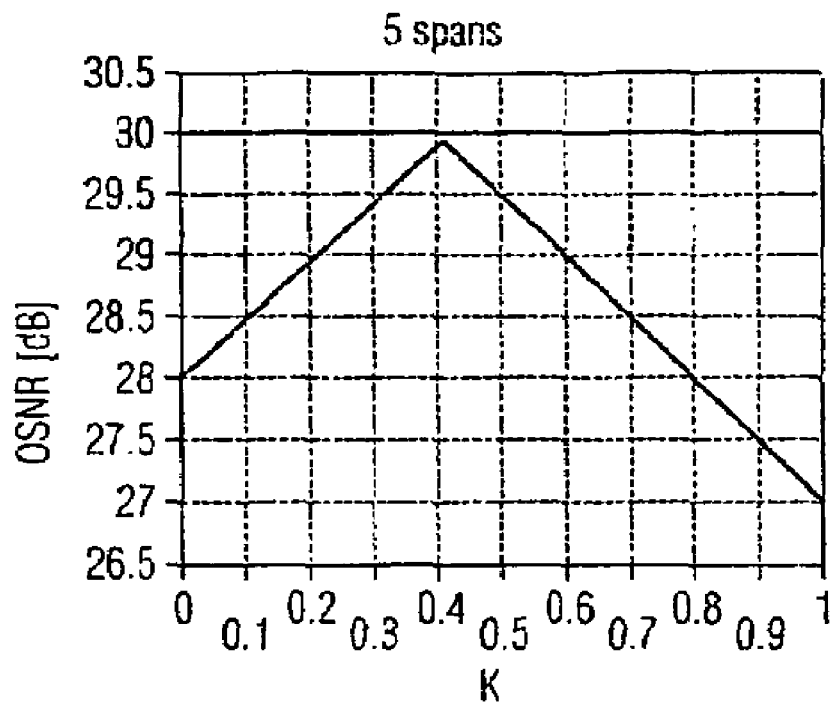
FIG. 4: smallest signal-to-noise ratio occurring as a function of a parameter k in 5 spans.
Figure 5:
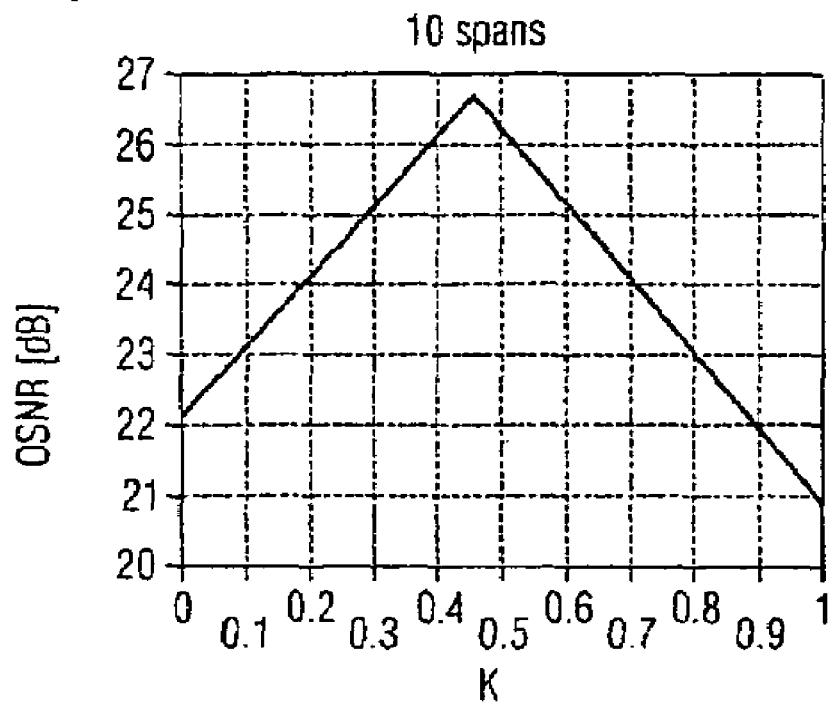
FIG. 5: smallest signal-to-noise ratio occurring as a function of the parameter k in 10 spans.
Figure 6:
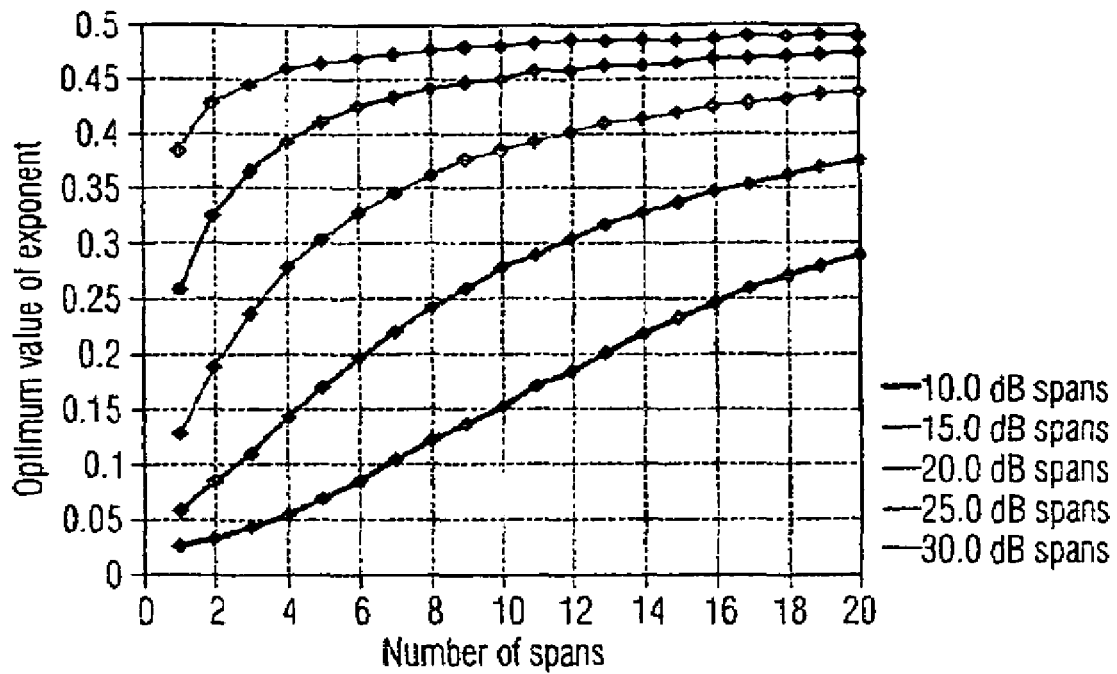
FIG. 6: optimum values of the parameter k for different span attenuations as a function of the number of spans.
Figure 7:
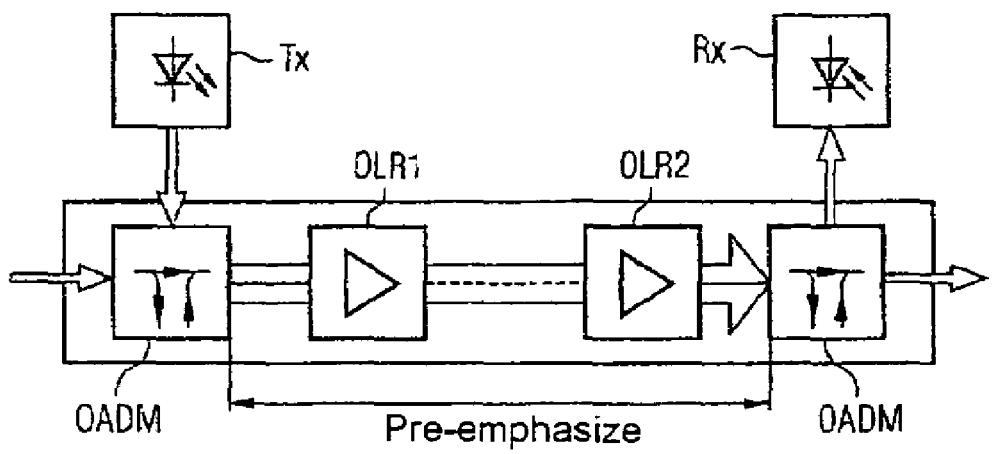
FIG. 7: a part link of an optical network.

The Figures show:

FIG. 4: smallest signal-to-noise ratio occurring as a function of a parameter k in 5 spans, FIG. 5: smallest signal-to-noise ratio occurring as a function of the parameter k in 10 spans, FIG. 6: optimum values of the parameter k for different span attenuations as a function of the number of spans, FIG. 7: a part link of an optical network.

A method in which initially for any channel power distribution $P_{IN}(\lambda)$ at the link input the corresponding channel power distribution $P_{OUT}(\lambda)$ is measured at the link output is now used as a starting point. In a second step input powers are set in accordance with the specification:

$$P_{IN}(\lambda)\_\text{new} = <P_{IN}> \cdot ((P_{IN}/P_{OUT})^{0.5})/<((P_{IN}/P_{OUT})^{0.5})>$$

with $P_{IN}(\lambda)$ and $P_{OUT}(\lambda)$ being represented by $P_{IN}$ or $P_{OUT}$. This allows almost identical values of the signal-to-noise ratios OSNR to be achieved for all channels, however deviations from a pure OSNR pre-emphasis are still produced.

It is shown below that the size of these deviations can be greatly reduced by introducing a variable exponent k with values ranging from 0 to 1—by comparison with 0.5 in the equation above, so that the method more closely approached the optimum results of an SNR pre-emphasis. The powers at the transmitter OTT Rx are now set in accordance with the specification $$P_{IN}(\lambda)\_\text{new} = <P_{IN}> \cdot ((P_{IN}/P_{OUT})^k)/<((P_{IN}/P_{OUT})^k)>.$$

Since the transmission function of the link can change when the input spectrum changes, it is worthwhile applying this method a number of times.

The task which now presents itself is that of determining an optimum setting of the exponent k. The two FIGS. 4 and 5 below show how the minimum signal-to-noise ratios OSNR (in dB) which occur as a function of the exponent k for a link with 5 and 10 spans LWL1, LWL2, etc. in accordance with FIG. 3. The span attenuation here amounts to 20 dB in each case. In these Figures an optimum (here appr. 0.4 for 5 spans and appr. 0.45 for 10 spans) of the exponent k can clearly be seen, so that the optical signal-to-noise ratios OSNR exhibit maximum values.

The following FIG. 6 now shows—for a changed average input power at the transmitter OTT Tx—the optimum value of the exponent k<1 as a function of the number (1 to 20) of spans LWL1, LWL2, etc. for different span attenuations (10 dB, 15 dB 20 dB 25 dB 30 dB. It is also clearly evident here that in addition to the span attenuation and the number of spans, the power at the transmitter output has a significant influence on the optimum value of the exponent k. Provided the wavelength dependency of the noise figure of the optical amplifiers OLR1, OLR2, etc in accordance with FIG. 3 is small in relation to the wavelength dependency of the gain transmission function for the same optical amplifier, deviations which occur can be minimized to a pure pre-emphasis of the optical signal-to-noise ratios OSNR through optimum selection of the exponent k.

There are a number of possibilities for optimizing the exponent k which are based on the formulae of the corresponding patent application:

Before a transmission link OTT Tx, LWL1, OLR1, LWL2, OLR2, . . . , OTT_Rx (link) is established, a planning tool is used. This knows typical values of the characteristic parameters of all optical components and can thus determine the optical signal-to-noise ratios OSNR produced as well as that parameter value of k with which the method based purely on power measurements comes as close as possible to the ideal OSNR pre-emphasis.

The modules used are dimensioned during production and make these values available to the network management system when they are installed in the system, which in its turn can again determine the optimum parameter value.

The individual receiver modules notify the measured bit error frequencies to the network management system. This uses this information for determining the optimum value of the exponent k.

On installation of a transmission link this is initially operated with few channels, so that one measurement of the optical signal-to-noise ratios OSNR is possible and a pure OSNR pre-emphasis can be performed. That parameter value of k is then defined which best approximates to the input spectrum to be set in this case. This value then continues to be used in the future for any given number of channels and also for component exchange.

In summary, the introduction of a variable exponent k allows a reduction in the deviations between a power-based method and the signal-to-noise ratio-based pre-emphasis.

In the previous part of the description of the invention a point-to-point transmission link was shown for the exemplary embodiments. The method for pre-emphasising an optical multiplex signal-is however also suitable for a complete network with a number of network nodes, between which optical point-to-point-data connections are arranged.

FIG. 7 shows a part link an optical network for which a pre-emphasis is to be executed. Signals are coupled in or coupled out at the network node arranged at the end in each case (shown here as the optical add-drop module OADM). The coupled-in signals can either come from another transmission link or can originate directly from transmitters Tx located at the location of the optical add-drop module OADM. At the end of the part link a part of the channels are fed to a further transmission link while the other part are for example terminated at a receiver Rx.

On the input side at the first optical add-drop module OADM1 the channels have different optical signal-to-noise ratio values $OSNR^{IN}$. Since a part of the channels must pass through further transmission links and the receivers can exhibit different characteristics (e.g. because of different data rates), it makes sense to impose different requirements of the optical signal-to-noise ratios $OSNR^{OUT}$ at the output of the transmission link. The wavelength dependency of the output-side signal-to-noise ratio required as a result of this requirement $OSNR^{OUT}$ is to be given by the function h with the average value 1, which is to be multiplied by the reciprocal value of a constant still to be determined into the resulting signal-to-noise ratio $OSNR^{OUT}$. The wavelength-dependent function $h(\lambda)$ is specified by a network planning tool. This selection is determined by a traffic matrix within the optical network. In addition the previously described exponent k should be known.

The power distribution to be set at the input of the part link thus produces the following equation $$P_{IN}(\lambda)\_\text{new} = (P_{IN}) \cdot \frac{G(\lambda)^{-k}}{\langle G(\lambda)^{-k}\rangle} \cdot \underbrace{\frac{OSNR^{IN}(\lambda)}{OSNR^{PP}}}_{BII} \cdot \underbrace{\frac{h(\lambda)}{OSNR^{IN}(\lambda) \cdot \alpha - h(\lambda)}}_{BIII},$$

with $OSNR^{PP}$ standing for that constant signal-to-noise ratio OSNR which would be produced in stand-alone operation of the transmission link in the network, and G(X) the wavelength-dependent gain of the transmission link considered. The parameter a is to be selected so that the average power $<P_{IN}>$ of the channels remains unchanged at the input. It can for example be determined with the aid of an iterative method on the computer.

In the equation specified above includes, in addition to the gain transmission functions of the part link to be measured, further parameters such as the optical signal-to-noise ratios $OSNR^{IN}$ at the input of the transmission link as well as the $OSNR^{PP}$ produced during stand-alone operation at the output of the transmission link. The two last parameters can of course be obtained from measurements. It is however advantageous to refer back to results of a numeric planning tool.

A special case is to be considered below. This case starts from the premise that the part link considered is part of a point-to-point-connection in a network, only channels are injected which all originate from the same source and all channels are terminated at the same point. In this case identical optical signal-to-noise ratios $OSNR^{OUT}$ are required at the output for all channels. All channels also posses identical optical signal-to-noise ratios $OSNR^{IN}$ at the input since a pre-emphasis has also been performed for the previous part link, which ensures the same optical signal-to-noise ratios OSNR for all its output channels. In the above equation BII and BIII consequently exhibit no longer exhibit any wavelength dependency and can be replaced by the value 1, after which the input power should remain constant. The result corresponds to that for an individual transmission link.

The following sections show how this method can be improved further and thereby the performance of WDM networks and links can be increased.

Further exemplary embodiments of the invention are explained in more detail below with reference to the drawing.

Figure 8:
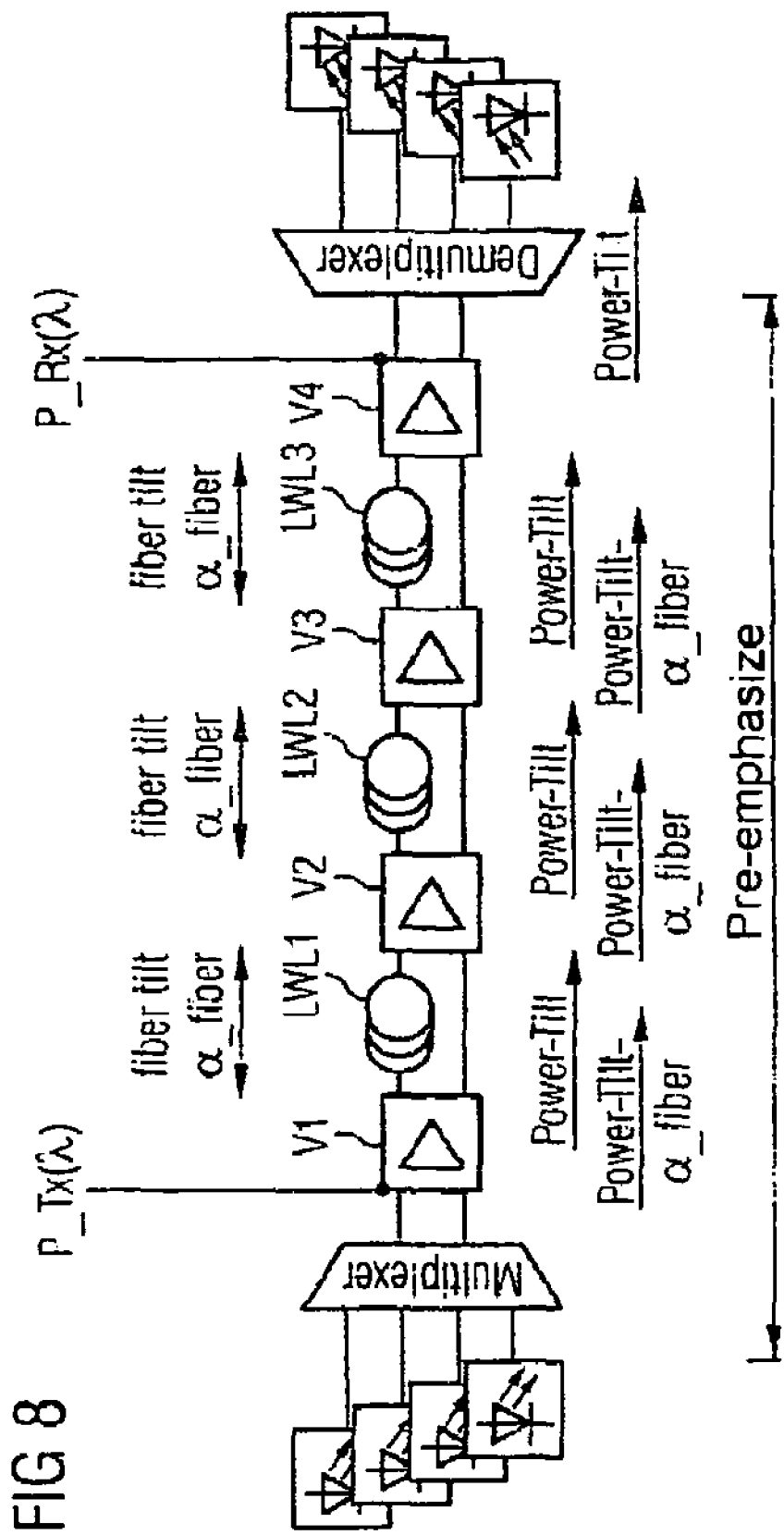
FIG. 8: a point-to-point transmission link with a number of optical amplifiers.
Figure 10A:
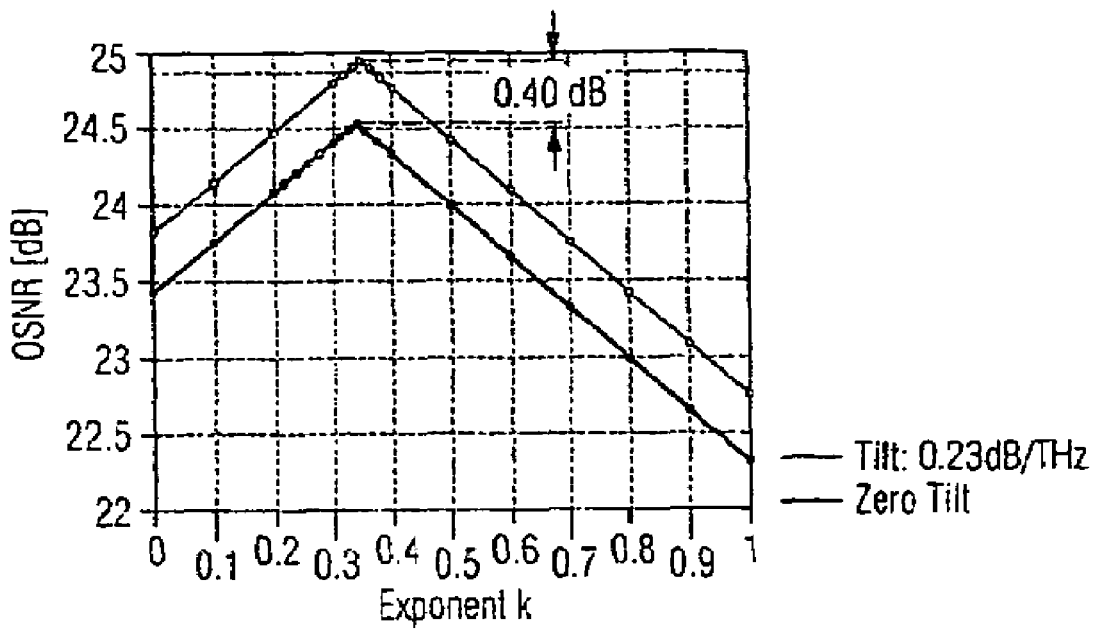
Figure 10B:
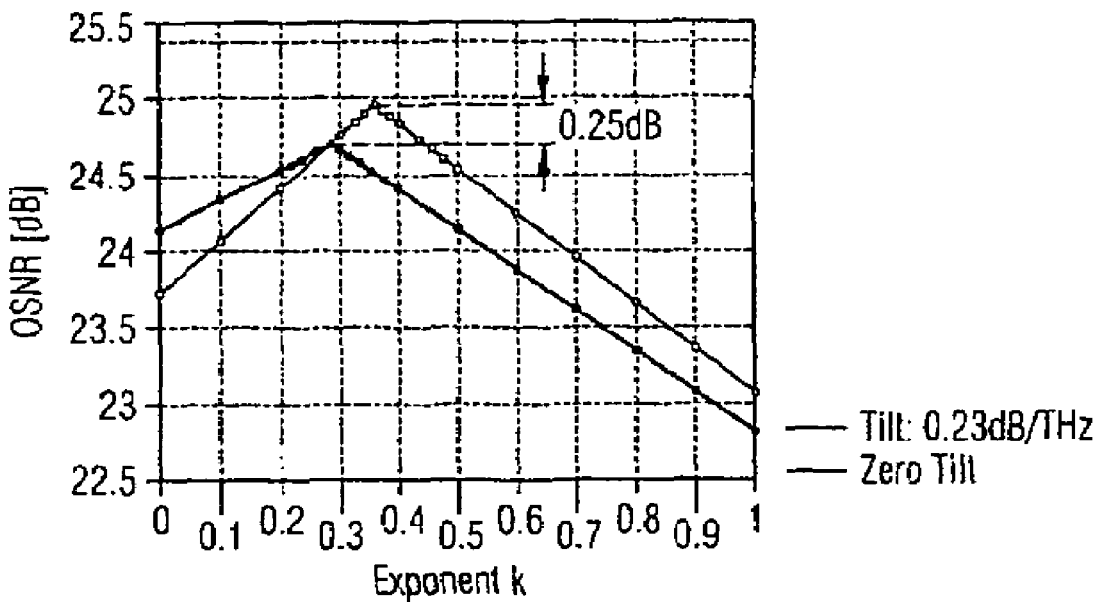
Figure 10C:
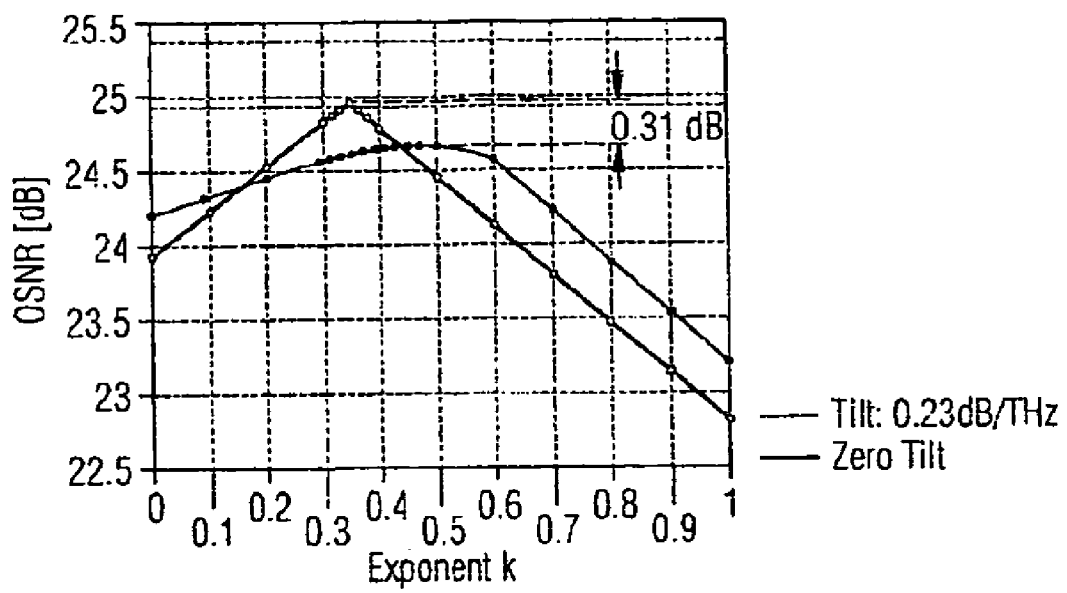
Figure 10D:
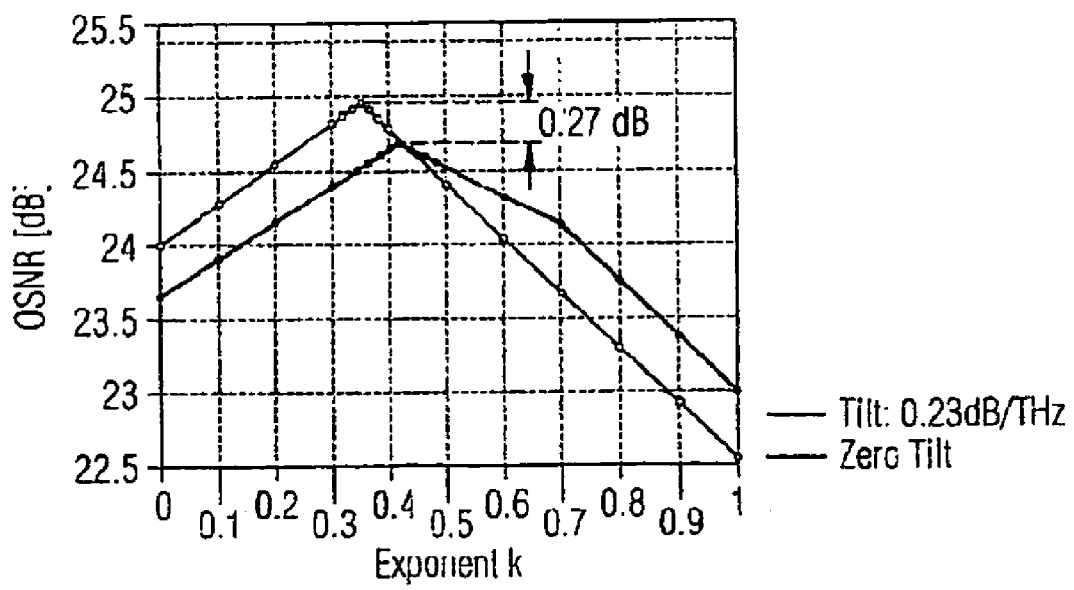

The Figures show:

FIG. 8: a point-to-point transmission link with a number of optical amplifiers, FIG. 9: signal-to-noise ratios after a pre-emphasis as a function of a tilting of an amplifier input, FIG. 10 a, b, c, d:
  ii. signal-to-noise ratios as a function of the exponent k for different amplification gains, FIG. 8 shows a point-to-point transmission link with a number of optical amplifiers V1, V2, V3, V4, between which transmission fibers LWL1, LWL2, LWL3 are connected. The Figure could relate instead to a part link of an optical network. A particular feature of this transmission link is that the optical amplifiers V1, V2, V3, V4 used can be activated or controlled in such as way that the rise of the optical power spectrum at the output of each amplifier V1, V2, V3, V4 has a predetermined value.

An important characteristic value of the method described below is increasing the power spectrum, which can be defined as the rise in a straight line which approximates to the logarithmic power distribution over there carrier frequency in the sense of a minimum sum of the error squares (linear regression). This rise is referred to below as the power tilt and has 30 dB/THz as its unit.

The aim of the method is, to set the optimum power tilt at the input of each amplifier so that after the pre-emphasis has been performed the optical signal-to-noise ratios OSNR are optimed. In FIG. 9 the optical signal-to-noise ratios OSNR— in dB—after a pre-emphasis—are shown as a function of tilting of an amplifier input as power—tilt of amplifier input in dB/THz. As FIG. 9 shows, for each noise figure tilt increase of a noise figure curve A, B, C, D, E or F, G, H, I, J (0.45 dB/THz, 0.23 dB/THz, 0.00 dB/THz, −0.23 dB/THz, −0.45 dB/THz), which in addition have been assumed to be identical for all amplifiers V1, V2, V3, V4 within the pre-emphasis section, there is precisely one power tilt value at the input of the amplifiers V1, V2, V3, V4, which leads to an optimum result. Another striking feature is that the optimum for small numbers of spans (e.g. V1, LWL1, V2) corresponds to the tilt of the noise figure (see upper curves A, B, C, D, E for 5 spans). With a larger number of spans (see lower curves for 20 spans) the maxima move to larger tilt values. A description is provided below of how this optimum power tilt value can be determined and how this optimization can be linked to the method of pre-emphasis of the previous optical signal-to-noise ratios OSNR and pre-emphasis with power tilt When using the previous pre-emphasis of the optical signal-to-noise ratios OSNR, in a first step the amplifiers provided as EDFA (erbium doped fiber amplifiers) V1, V2, V3, V4 are set so that the power tilt disappears at the input of the relevant subsequent V2, V3, V4 and at the output of the preamplifier V4 at the link end (power tilt should be zero). The optical signal-to-noise ratios OSNR of the output spectrum are then determined. If the power tilt at the inputs of the amplifiers V1, V2, V3, V4 is now set so that it corresponds to the negative tilt of the optical signal-to-noise ratios OSNR specified in the logarithmic scale, the subsequently performed pre-emphasis of the optical signal-to-noise ratios OSNR leads to an optimum result.

By comparison with previous pre-emphasis, pre-emphasis with power tilt offers the advantage of a greatly reduced execution time and can also be used in systems and networks in which a measurement of the optical signal-to-noise ratios OSNR is not possible in accordance with the current prior art. Since the optical signal-to-noise ratios OSNR are not known in this case the optimum value of the power tilt must be determined in another way. The procedure for doing this is as follows:

In a first step—as is already done with the previous pre-emphasis —the amplifiers V1, V2, V3, V4 are set so that the power tilt disappears at the input of the subsequent amplifier V2, V3, V4 in each case and at the output of the preamplifier V4 at the end of the link (power tilt should be zero). From the linear power spectrums P Tx(λ), P Rx(λ) of a transmitted WDM signal measured at the input of a booster V1 and at the output of the preamplifier V4, a gain $G_{link}(\lambda)$ is calculated. From this variable, in accordance with the pre-emphasis with power tilt already described the required spectrum at the input of the booster V1 can be determined, with a normalized correction function Q(λ)

$$Q(\lambda) = \frac{G_{Link}^{-k}(\lambda)}{\langle G_{Link}^{-k}(\lambda) \rangle} \text{ with } G_{Link}(\lambda) = \frac{P\_RX(\lambda)}{P\_TX(\lambda)}$$

being used. The factor k has already been determined previously by a planning tool. Alternatively for equidistant spans the equation $$Q(\lambda) = \frac{G_{Link}(\lambda) - 1}{G_{Link}(\lambda) - G_{Link}^{N(N+1)}(\lambda)}$$

can also be used, with N standing for the number of identical spans in the overall transmission link. The optimum power tilt at the input of the amplifiers V1, V2, V3, V4 now corresponds to the tilt of the product of this variable and the effective noise figure $F_{eff}$, with the term effective noise figure being explained below. The tilt of the variable Q(λ) (in dB/THz) and the tilt of the effective noise figure Feff (also in Db/THz) can be added approximately to the resulting power tilt.

The power distribution P Tx(k) to be set at the input of the booster V1 is now calculated under the condition of constant average input power $(P\_Tx(\lambda)^{start})$ as follows:

$$P\_Tx(\lambda) = \frac{\langle P\_Tx(\lambda)^{start} \rangle}{\langle Q(\lambda) \cdot F_{eff}(\lambda) \rangle} \cdot (\lambda) \cdot F_{eff}(\lambda)$$

The variables occurring in this equation are to be used in the linear scale. A significant advantage of the optimization can be seen from the following FIGS. 10a, 10b, 10c, 10d. These show the optical signal-to-noise ratios OSNR as a function of the exponent k for a transmission link with 5 spans, for which the optimum value of the power tilt is 0.23 dB/THz. Different gain profiles have been assumed for the individual results in each of the FIGS. 10a, 10b, 10c, 10d. For the applicability of the method the fact that the optimum value of the exponent k is practically independent of the gain profile of the amplifier, if the power tilt assumes the optimum value, represents a significant improvement by comparison with a regulation to disappearing power tilt in which major differences are observed.

The effective noise figure $F_{eff}$ is best calculated by a planning tool which knows typical values for the gain curve Gk(λ) and the noise figure Fk(λ) of the individual amplifiers V1, V2, . . . With the link attenuations $a_k(\lambda)$ for N spans LWL1, LWL2, . . . and (N+1) amplifiers V1, V2, . . . the effective noise figure $F_{eff}(\lambda)$ is now produced for $$F_{eff}(\lambda) = \frac{\sum_{K=0}^{N} F_k(\lambda) \cdot G_k(\lambda) \cdot \prod_{J=k+1}^{N} a_j(\lambda) \cdot G_j(\lambda)}{\sum_{K=0}^{N} G_k(\lambda) \cdot \prod_{J=k+1}^{N} a_j(\lambda) \cdot G_j(\lambda)}$$

All variables occurring in this equation are basically wavelength-dependent (λ). Should the wavelength dependence however be known it is also possible to work with approximated variables.

For identical amplifiers V1, V2, . . . the effective noise figure $F_{eff}(\lambda)$ corresponds to the noise figure of an individual amplifier e.g. V1.

For implementation: Alternatively, instead of a measurement of the power spectrum at the input of the booster V1 a measurement can also be taken at its output and a corresponding calculation of the booster output and input powers required can be performed.

In summary the method is improved such that additional at the input of each amplifier V1, V2, . . . a optimum tilt (known as power tilt) will be applied with smaller numbers of spans LWL1, LWL2, . . . the tilt applied corresponds exactly to the tilt of the noise figure of the amplifier.

The invention claimed is:

1. A method of pre-emphasizing an optical multiplex signal comprising a plurality of signals having different wavelengths, the plurality of signals transmitted from a transmitter to a receiver, the method comprising:

determining an avenge power for the signals to be transmitted to the receiver;

determining a first current power of the signals at the transmitter;

determining a second current power of the signals at the receiver;

determining new power values from the first and second current powers and the average power; and adjusting a transmitting power of the transmitter according to the new power values, wherein determining the new power values is based on equalizing signal-to-noise ratios of the signals received at the receiver, wherein the plurality of signals is optically transmitted over N+1 optical amplifiers connected in series and having substantially equal amplification characteristics, and over N transmission links connecting the N+1 optical amplifiers, and wherein the new cower values regarding at least one of the plurality of signals transmitted over the N+1 optical amplifiers are determined according to the following formula:

$$P_{IN}(\lambda)\_new := \langle P_{IN} \rangle \cdot \frac{Q(\lambda)}{\langle Q(\lambda) \rangle} \{in \text{ mW}\},$$

wherein <Pin> designates the average power of the at least one signal at the transmitter, and wherein, for tolerating a balance of the signal-to-noise ratios of the signals received at the receiver, the function Q(λ) is defined as follows:

$$\frac{Q(\lambda)}{<Q(\lambda)>} = k\frac{f(\lambda)}{\lambda} \cdot \frac{1}{N+1} \cdot \frac{G_{LINK}-1}{G_{LINK}^{\frac{N}{N+1}} \cdot \left[G_{LINK}^{\frac{1}{N+1}} - 1\right]},$$

wherein $G_{LINK}$ is an overall gain of a channel determined from the first and second current powers, $f(\lambda)$ is a spectral number function of the optical amplifiers, and K is a constant.

2. The method in accordance with claim 1, wherein adjusting the transmitting power is further based on spectral influences of a transmission link between the transmitter and the receiver.

3. The method in accordance with claim 2, wherein the spectral influences include an influence chosen from the group consisting of amplification, noise influences and attenuation.

4. The method in accordance with claim 1, wherein the function $Q(\lambda)/<Q(\lambda)>$ is approximated by $1/\sqrt{G_{LINK}}$.

5. The method in accordance with claim 1, wherein normalized power spectra of the signal at the transmitter and at the receiver are inverse functions to each other.

6. A method of pre-emphasizing an optical multiplex signal comprising a plurality of signals having different wavelengths, the plurality of signals transmitted from transmitter to a receiver, the method comprising:
  determining an average power for the signals to be transmitted to the receiver;
  determining a first current power of the signals at the transmitter;
  determining a second current power of the signals at the receiver;
  determining new power values from the first and second current powers and the average power; and
  adjusting a transmitting power of the transmitter according to the new power values, wherein determining the new power values is based on equalizing signal-to-noise ratios of the signals received at the receiver, wherein the new power values are determined using the following formula:

$$P_{IN}(\lambda)\_new := <P_{IN}> \cdot \sqrt{\frac{P_{IN}(\lambda)}{P_{OUT}(\lambda)}} \cdot \sqrt{\frac{<P_{OUT}>}{<P_{IN}>}} \; \{in \; mW\},$$

wherein the pointed brackets <...> designate an averaging of an argument over a bandwidth $\Delta\lambda$ of the signals, $P_{IN}(\lambda)$ designates the first current power, and $P_{OUT}(\lambda)$ designates the second current power.

7. A method of pre-emphasizing an optical multiplex signal comprising a plurality of signals having different wavelengths, the plurality of signals transmitted from a transmitter to a receiver, the method comprising:
  determining an average power for the signals to be transmitted to the receiver;
  determining a first current power of the signals at the transmitter;
  determining a second current power of the signals at the receiver;
  determining new power values from the first and second current powers and the average power; and
  adjusting a transmitting power of the transmitter according to the new power values, wherein determining the new tower values is based on equalizing signal-to-noise ratios of the signals received at the receiver, wherein the new power values are determined using the following formula:

$$P_{IN}(\lambda)\_new := <P_{IN}> \cdot \left(\frac{P_{IN}(\lambda)}{P_{OUT}(\lambda)}\right)^k \Big/ \left\langle\left(\frac{P_{IN}}{P_{OUT}}\right)^k\right\rangle \; \{in \; mW\},$$

wherein the painted brackets <...> designate an averaging of an argument over the bandwidth $\Delta\lambda$ of the signals, $P_{IN}(\lambda)$ designates the first current power, $P_{OUT}(\lambda)$ designates the second current power, and k designates a constant within the range $0<k<1$.

8. The method in accordance with claim 7, wherein an optimum of the constant k is selected such that system-related deviations of the signal-to-noise ratios occur are minimized.

9. The method in accordance with one of the claim 7, wherein the constant k is selected using a planning tool of a network management system or using measurements of the signal-to-noise ratios.

10. The method in accordance with claim 7, wherein signal-to-noise ratios related to selected signals or groups of signals at the transmitter and at the receiver are determined for control purposes.

11. The method in accordance with claim 7, wherein the transmitter and receiver comprise optical amplifiers.

12. A method of pre-emphasizing an optical multiplex signal comprising a plurality of signals having different wavelengths, the plurality of signals transmitted from a transmitter to a receiver, the method comprising:
  determining an average power for the signals to be transmitted to the receiver;
  determining a first current power of the signals at the transmitter;
  determining a second current Dower of the signals at the receiver;
  determining new power values from the first and second current powers and the average power; and
  adjusting a transmitting power of the transmitter according to the new power values,
  wherein determining the new power values is based on equalizing signal-to-noise ratios of the signals received at the receiver,
  wherein adjusting the transmitting power is further based an spectral influences of a transmission link between the transmitter and the receiver,
  wherein the transmission links are cart links of an optical network, and a pre-emphasis is executed for each part link,
  wherein the new power values at the transmitter of a part link is determined using the following formula:

$$P_{IN}(\lambda)\_new = (P_{IN}) \cdot \frac{G(\lambda)^{-k}}{\langle G(\lambda)^{-k}\rangle} \cdot \frac{OSNR^{IN}(\lambda)}{OSNR^{PP}} \cdot \frac{h(\lambda)}{OSNR^{IN}(\lambda) \cdot \alpha - h(\lambda)},$$

wherein the optical signal-to-noise ratio value $OSNR^{PP}$ designates such constant signal-to-noise ratio which would be produced in standalone operation of the transmission link in the network, $G(\lambda)$ designates an wavelength-dependent gain of the transmission link, and $h(\lambda)$ designates a desired wavelength-dependent function of signal-to-noise ratios occurring at an end of the part link, wherein the parameter $\alpha$ is selected such that the average power $<P_{in}>$ of channels at the input of the part link remains unchanged, and wherein $OSNR^{IN}(\lambda)$ designate wavelength-dependent signal-to-noise ratios at an input or the part link.

13. The method in accordance with claim 12, wherein the plurality of signals are transmitted within a fully optical transparent network.

14. The method in accordance with claim 12, wherein the plurality of signals are transmitted using a DWDM transmission, and spectral spacings between channels occupied by the signals are selected at 100 GHz or below.

15. The method in accordance with claim 12, wherein an additional pre-emphasis of powers of the signals at the transmitter is used for adjusting measured signal-to-noise ratios at the receiver.

16. The method in accordance with claim 12, wherein a spectrum of the signal-to-noise ratios is determined and examined for a tilting or a non-linear deviations.

17. The method in accordance with claim 16, wherein the new power values are determined such that the detected tilting or non-linear deviation is compensated for.

18. The method in accordance with claim 12, wherein at least one of the transmission links has a number of downstream optical amplifiers and optical wave guides, and the optical amplifiers are configured to be regulated such that an increase of an optical power spectrum at an input of each amplifier has a predetermined value.

19. The method in accordance with claim 18, wherein this predetermined value corresponds to a tilt of a predetermined noise figure.

* * * * *